United States Patent [19]

Hentzschel et al.

[11] Patent Number: 4,464,584
[45] Date of Patent: Aug. 7, 1984

[54] MICROPROCESSOR WITH RESETTING CIRCUIT ARRANGEMENT

[75] Inventors: Hanspeter Hentzschel, Munich; Achim Beek, Weissenfeld, both of Fed. Rep. of Germany

[73] Assignee: Eurosil GmbH, Erching, Fed. Rep. of Germany

[21] Appl. No.: 312,989

[22] Filed: Oct. 20, 1981

[30] Foreign Application Priority Data

Oct. 25, 1980 [DE] Fed. Rep. of Germany ....... 3040326

[51] Int. Cl.³ .................... H03K 17/22; H03K 17/28
[52] U.S. Cl. ............................. 307/200 A; 307/592; 364/900
[58] Field of Search ............... 307/200 A, 200 B, 593, 307/597, 592; 328/129.1; 364/200 MS File, 900 MS File

[56] References Cited
U.S. PATENT DOCUMENTS

| | | | |
|---|---|---|---|
| 3,599,016 | 8/1971 | Leightner | 307/593 |
| 4,131,855 | 12/1978 | Hamagawa | 328/129.1 |
| 4,232,236 | 11/1980 | Yomogida et al. | 307/200 A |
| 4,348,743 | 9/1982 | Dozier | 364/900 |
| 4,367,422 | 1/1983 | Leslie | 307/597 |

Primary Examiner—John S. Heyman
Attorney, Agent, or Firm—Scully, Scott, Murphy & Presser

[57] ABSTRACT

In a microprocessor with a reset circuit arrangement acting in dependence upon the inception of its supply voltage, safe operation is ensured after stoppages or operating voltage interruptions, particularly in view of a delay of the internal program flow up to the orderly start of a quartz-stabilized oscillator in the stationary operation. A reset signal derived from the supply voltage is conducted through a switching stage steadily to the reset input of the microprocessor, which is deactivatable in dependence upon the start of the oscillator contained in the microprocessor so that the reset input is no longer controlled during the steady-state operation. The switching stage, designed as an external microprocessor circuit, is preferably controlled through a voltage booster circuit as normally provided in clock microprocessors for controlling a digital display, and which is supplied through the divided oscillator frequency. It is used particularly in microprocessor-clock components to ensure the start of the processing of the internal program for time determination and time display only after a steady-state operating stage of the quartz stabilized oscillator has been achieved.

5 Claims, 1 Drawing Figure

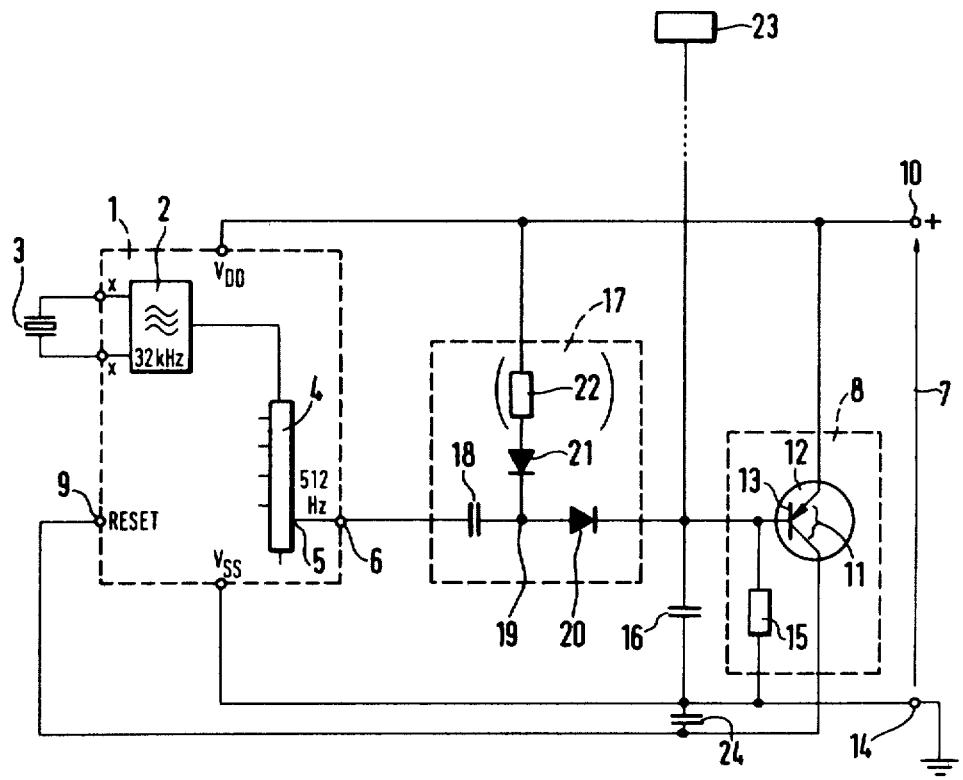

MICROPROCESSOR WITH RESETTING CIRCUIT ARRANGEMENT

BACKGROUND OF THE INVENTION

1. Field of the Invention

The present invention relates to a microprocessor with a resetting circuit arrangement operating in dependence upon the detected inception of its supply voltage.

2. Discussion of the Prior Art

A microprocessor of that type which can be reset through its reset input upon the initial appearance of the supply voltage, after an operating pause or brief interruption of the supply voltage, is known from German Published Patent Application No. 29 36 683. The reset sequence therein based is substantially on a delayed actuation of the reset input with a reset potential, wherein the delay is achieved through the charging sequence of a condenser which is rapidly discharged upon cessation of the operating voltage. Herein, however, disadvantageous is that the reset input remains constantly subjected to the reset signal during the normal operation of the microprocessor; and it is above all disadvantageous that a fixed time interval is preset for the occurance of the reset potential after the restoration of the supply voltage due to the design of the condenser charging circuit.

SUMMARY OF THE INVENTION

Accordingly, the invention is predicated on the recognition that the preparedness of a reset signal within a definite time delay after the initiation of the buildup of supply voltage for the microprocessor can lead to considerable and difficult to recognize errors at the commencement of the function of the internal program running the microprocessor, inasmuch as under certain circumstances the reset signal is only effective when, due to environmental conditions and/or an irregular time behavior in the buildup of the supply voltage, appropriate output conditions have not yet been achieved for the operationally correct sequence of the internal programs of the microprocessor. In particular when the microprocessor is equipped with a clock oscillator for synchronizing the internal operations of the computer and/or is constructed as an electronic clock component for determining the time or for controlling a time display, there can occur that the buildup of the supply voltage is completed before the oscillator has attained a steady-state frequency; with the consequence, that either the internal control will not at all detect the reset signal, or that the internal program cycle and thus also the time determination will be already actuated before a steady-state operating condition has been reached for the timekeeping circuit.

Also, when the microprocessor has been designed so that after the buildup of the supply voltage, through manual input there can be effected a so-called master-clear, in essence a program reset, the danger is present that the respective keyboard will be actuated at the wrong instance and program sequence errors or errors in time determination will immediately occur at the start of the operation of the microprocessor.

In recognition of these interrelationships, the invention has as its object, in a microprocessor of the above-mentioned type, particularly when it is equipped with a relatively slowly starting quartz-stabilized oscillator, to provide an energy efficient and particularly safe reset function with relatively little additional external circuit requirements for the microprocessor.

According to the invention the foregoing object is achieved in that the microprocessor with a reset circuit arrangement as described hereinabove has a reset signal tapped off from the supply voltage conducted to the reset input of the microprocessor, which can be deactuated in dependence upon the excitation of an oscillator contained in the microprocessor.

The foregoing affords that a stationary reset signal acts on the microprocessor as soon as the supply voltage is built up sufficiently for the connecting through of the switching stage, and thereby also for effectuation in the microprocessor itself, and remains present for effect on the microprocessor reset input, until the element of the microprocessor which is critical regarding the time behavior, in essence the oscillator, has reached a steady-state operating mode and deactivates the switching stage so that the reset input is no longer actuated during the operation of the microprocessor, which enhances the trouble-free operation of the microprocessor. Since the reset logic in the microprocessor itself can be designed for the formation and the starting of the internal program sequence for the disappearance of the reset potential at the reset input, there is provided an extremely determinate and trouble-free entry into the regular operation of the microprocessor in which the resetting sequences are performed and the oscillator is started during formation of reset signal, while, however, the internal program sequence, such as the current time determination and display control, is only started after an output condition ensuring the steady-state operation has been achieved (with deactivation of the reset signal based on reaching of a stable operating mode of the oscillator).

It is of particular advantage, according to a further feature of the invention to utilize the frequency divider connected, as a rule, to the output of the quartz oscillator, particularly in a clock microprocessor, a delay function with respect to the deactivation of the steady-state reset potential at the reset input in dependence upon the reaching of a steady-state mode of operation of the oscillator, this will ensure that not the occurence of the first output oscillations of the oscillator will lead to the deactivation of the reset switching stage, but first only a larger number of oscillating cycles of the oscillator output signal, in effect, dependent upon the output of which divider ratio is conducted to the switching stage.

The switching stage can be very simply effected as an external microprocessor circuit.

In order to afford a definite switching-over sequence for the switching off of the steady-state reset potential notwithstanding substantially equal voltages across the electronic switching stage and at the microprocessor inputs and outputs, it can be suitable to provide ahead of the control input of the switching stage a so-called voltage booster circuit. Proven as suitable for the operation of such a voltage booster circuit, particularly in clock switching circuits for driving digital time displays, has been the 512 Hz output of the frequency divider. In the event that the microprocessor is moreover used for driving a display across a voltage doppler circuit driven from the frequency divider, then within the scope of the invention, an additional external circuit of the microprocessor for control of the switching stages is not necessary, in that the switching stage for the switching off of the steady-state reset potential is connected downstream of the voltage doppler circuit designed for the display control.

BRIEF DESCRIPTION OF THE DRAWING

Further features and advantages of the invention may now be ascertained from the following description of a preferred embodiment of the invention, illustrated in simplified form in the sample FIGURE of the drawing, which shows the circuitry of a microprocessor written in the block circuit diagram.

DETAILED DESCRIPTION

Microprocessor 1 includes a stable quartz clock oscillator 2 particularly when microprocessor 1 is to be used for time-keeping purposes, for example, to control a clock display. Clock 2 has a frequency divider 4 connected to its output to produce different frequency pulse trains, obtained by division of the high frequency clock pulse train, which are used for controlling the internal operations of the microprocessor 1, as well as for the control of external circuits and apparatuses. Particularly when the microprocessor drives a clock such as in the continuous time-dependent control of a liquid crystal time display, the frequency divider 4 produces in a usual manner a 512 Hz signal on tap-off 5, which drives through an associated output pin 6 of microprocessor 1 a voltage doubling circuit to produce a suitable amplitude control voltage necessary for the liquid crystal displays.

Microprocessor 1 is equipped with a reset circuit arrangement in the form of a switching stage 8 responsive to the activation of its power supply voltage 7, through which a reset input 9 of microprocessor 1 is controlled at the start of the operation, or after a supply voltage interruption, to ensure a proper mode of operation, particularly with respect to the internal control sequences of the microprocessor. For this purpose, a reset potential is applied to switching stage 8 to the positive pole 10 of the lead wire for the supply voltage 7.

The internal functional sequences in the microprocessor 1 are so designed that, during the presence of the reset potential the internal control sequences are set to revert to the start of the program to initialize operations of the microprocessor. Concurrently with the appearance of this reset signal, clock oscillator 2 also commences to oscillate. Only after oscillator 2 has actually begun to oscillate (and has produced a given number of clock pulses such that the frequency divider 4 produces a first signal at output tap-off 5 and pin 6, which reverses the switching stage so that the signal is removed from the reset input 9 and microprocessor is started. The reset input 9 thus is controlled through switching stage 8 until the oscillator 2 is not only started, but also has attained a steady-state stable mode of operation, thereby ensuring through frequency divider 4 that the steady-state signal reset for maintaining the internal function sequence is completed only after a certain time interval in effect after a certain number of oscillator cycles or clock pulses.

Switching stage 8 can be basically realized as a digital or analog switch (transmission gate), depending upon the prior requirements, or simply as an emitter-collector section 11 of a bipolar transistor 12. An operating point resistor 15 is connected between transistor base 13 and the ground Vss of the supply voltage which provides to the base 13 the necessary potential for far conduction across the emitter-collector section 11 at the appearance of supply voltage 7 across poles terminals 10,14, and thus control reset input 9. After oscillator 2 has stabilized its operation, the operating point voltage is superposed at base 13 by a voltage from the microprocessor output 6 that with the emitter-base section of transistor 12, its emitter collector section 11 is likewise blocked, in essence the control of reset input 9 is lifted due to the now steady-state operation of microprocessor 1. Because of the pulsating voltage of microprocessor output 6 powered by the frequency divider 4, a filter condenser 16 is preferably provided ahead of base 13, which prevents pulsed control of transistor 12.

In the interest of a steep reversing characteristic for the switching stage 8, the latter preferably has a voltage booster circuit 17 connected ahead thereof as shown in the drawing, which principally operates like the known voltage doubling circuits. Essentially it consists of a coupling condenser 18 whose one coating, here facing nodal point 19, is charged in a steady-state to a certain potential, which is raised by this control voltage when the opposite, here the microprocessor output 6 is raised. The steady-state potential at nodal point 19 is essentially determined, at a through-connected switching stage 8 by the emitter and thereby the potential $V_{DD}$ of the positive pole 10 (namely less the voltage drop across the emitter-base-diode section of transistor 12 operated in the transmissive direction) including the forward voltage drop-off across the output diode 20. At a blocked switching stage 8 however, the potential at nodal point 19 is determined from the series-connection of the transistor operating point resistor 15 and the output diode 20, on the one hand, as well as a supply diode 21 with series resistor 22, on the other hand, including the voltage boost due to the pulse control of coupling condenser 18 from microprocessor output 6 which is connected to the frequency divider 4. Hereby, that series-connection, considering the smoothing effect of condenser 24, is so designed that this voltage rise suffices for steady blocking control over transistor base 13.

At the start of the operation, or after a temporary interruption of supply voltage 7, oscillator 2 does not yet momentarily operate, in essence, transistor 12 is not yet controlled in the switching stage 8 through the voltage booster circuit 17 from the microprocessor 1; instead transistor 12 is switched across its operating point resistor 15 to conduct across its emitter-collector section 11, and due to the steady-state control of reset input 9 with positive polarity of the supply voltage 7, clock oscillator 2 can commence to oscillate. When oscillator 2 has been in operation for a sufficient time that an output signal of positive polarity appears for the first time at the frequency divider tap-off 5, the potential at nodal point 19 in voltage booster circuit 17 is raised through coupling condenser 18, and the potential at the base 13 of transistor 12 so that the transistor 12 is blocked and the control of reset input 9 is thereby lifted to start steady-state operation of the microprocessor 1. Voltage booster circuit 17 cn be a part of a voltage doubling control of display 23, such as for display of a digital clock time, so that no additional circuitry is required for the assured transition from the preparation phase to the operating phase of microprocessor 1 through switching off of the steady-state reset signal. During the stationary operation there is no longer any power consumption across switching stage 8, because transistor 12 remains steadily controlled on the high-ohmic emitter-collector section 11 from the microprocessor output 6 controlled by the frequency divider 4. Over the discharge-time constant of filtering condenser 16, to which resistor 15 is connected in parallel, there can be determined which time magnitude of the supply voltage collapses will not yet lead to a new resetting of microprocessor 1, at which interruption period the supply voltage 7 in effect switching stage 8 will again open after the reappearance of supply voltage 7, so as to set microprocessor 1 again over its reset input 9 into the initial condition.

It may be suitable as shown in the drawing, to provide parallel to the reset input 9 in a known manner a delay condenser 24 whereby resistance value of the operating point resistor 15 can be reduced in a desired manner and the series resistor 22 can also be dimensioned very small or even completely omitted with simultaneous improvement of the mode of operation of this reset circuit arrangement in view of a supply voltage 7 with an only slow voltage rise. A low ohmic operating point resistor 15 is generally sought after, and the effective resistance of voltage booster circuit 17 must in turn be low-ohmic compared with the operating point resistor 15, so that transistor 12 clearly operates in switching operation, accordingly, is either clearly switched-through or is high-ohmic, depending upon the control from the frequency divider output 6. This results in a small time constant of the RC-element from resistor 15 and filter condenser 16; that is, the reset control with the inception of the supply voltage 7 is rapidly ended when the pulses with the repetition frequency of 512 Hz appear at divider output 6, while it reappears with great delay when this output pulse sequence stops. Particularly in applications where supply voltage 7 rises slowly, it may occur under unfavorable conditions that first pulses already appear at output 6, due to oscillations of a dynamic frequency divider 4 (and deactivate the reset signal) when no minimum supply voltage 7 has as yet been reached in microprocessor 1 for the operation of the other circuits therein; in this case the programmed masterclear can no longer become effective.

The addition of delay condenser 24 has the result that even a short interruption of the pulse sequence at output 6 triggers a reset signal, and maintains this masterclear program state over a sufficient period of time (given by the time constant from resistor 15 and condenser 24), so that clear program sequence conditions are ensured by a correspondingly long-lasting masterclear-program condition.

Ths further development eliminates the necessity for an external component, inasmuch as the series-resistor 22 is no longer required for dimensioning the interrogating time constants, and it is possible to use for the operating point resistor 15 the parallel connection of a few integrated resistors which are already incorporated in the circuits of microprocessor 1.

What is claimed is:

1. In a microprocessor having a supply voltage, a reset input and a clock oscillator for supplying clock signals to synchronize operations of the microprocessor, a reset circuit means operating in dependence upon the initial appearance of the supply voltage for applying a reset signal which is derived from the initial appearance of the supply voltage, to said reset input of the microprocessor, including a switching stage, including means responsive to the start of the clock oscillator begun at the presence of said reset signal for deactivating the reset circuit means to remove the reset signal from the reset input after a time period to thereby ensure a steady state clock and syndronous operating conditions for said microprocessor.

2. A microprocessor as claimed in claim 1, wherein said switching stage is driven by a signal produced by a frequency divider circuit connected to the output of the oscillator.

3. A microprocessor as claimed in claim 1 or 2, wherein said switching stage comprises a bipolar transistor coupled to the supply voltage and wherein conduction between its emitter and collector is utilized to generate said reset signal.

4. A microprocessor as claimed in claim 3, wherein a delay capacitor is connected in parallel to the reset input, and is coupled through said transistor to the supply voltage to form, in combination with an operating point resistor of the transistor, a delay circuit.

5. A microprocessor as claimed in claim 1, wherein said switching stage comprises a voltage booster circuit.

* * * * *